July 17, 1934.  F. K. CHANDLER  1,967,022
APPARATUS FOR GRINDING AND HANDLING FEED
Filed June 15, 1931  2 Sheets-Sheet 1
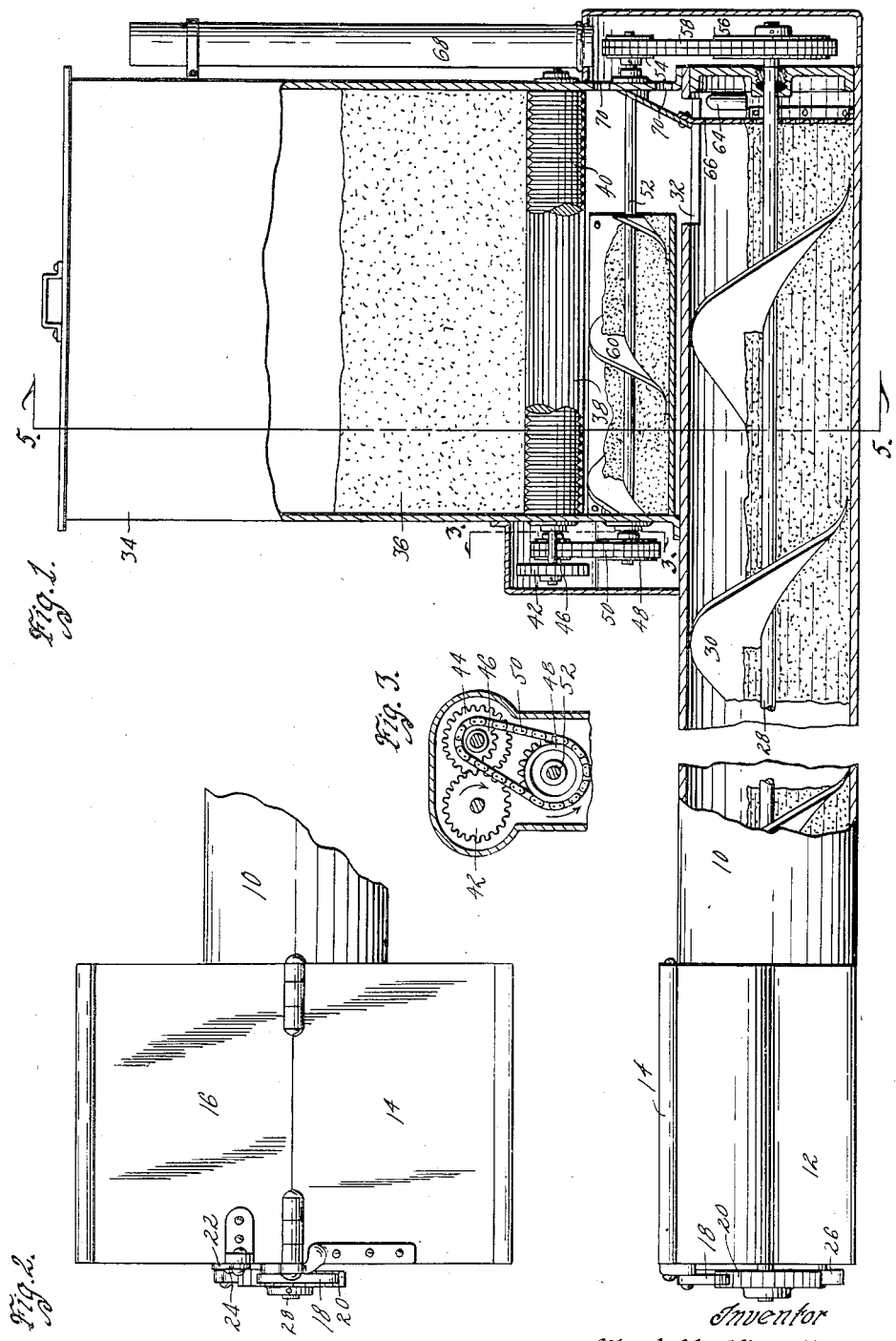
Inventor
~ Fred K. Chandler ~
by Bair, Freeman & Sinclair
Attorneys
Witness
H. S. Mungenmaier

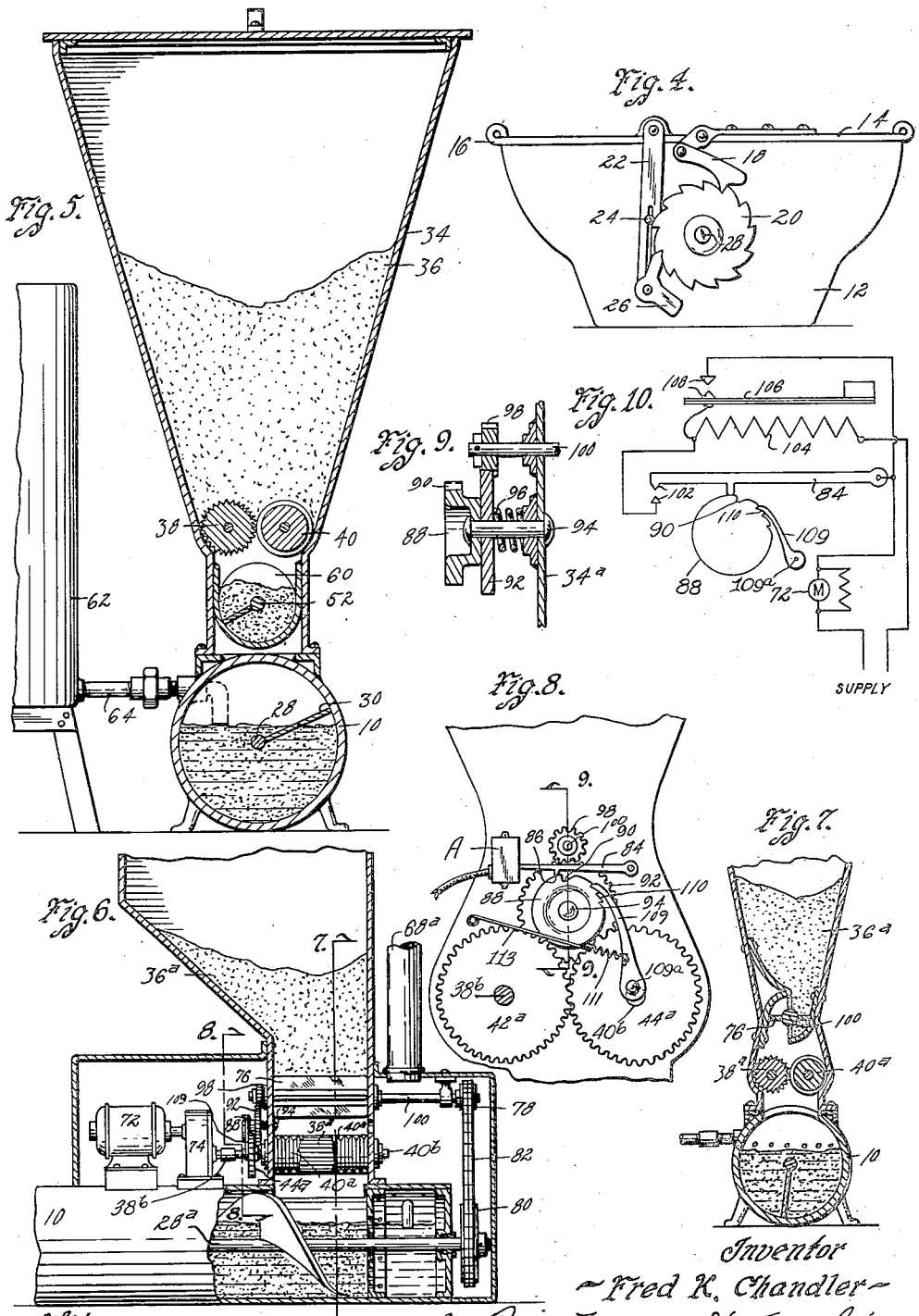

Patented July 17, 1934

1,967,022

UNITED STATES PATENT OFFICE 1,967,022

APPARATUS FOR GRINDING AND HANDLING FEED

Fred K. Chandler, Des Moines, Iowa

Application June 15, 1931, Serial No. 544,534

14 Claims. (Cl. 119—54)

My present invention relates to an apparatus for grinding and handling feed, which is of simple, durable and inexpensive construction.

An object of the present invention is to provide an improvement over my apparatus and method for handling feed, as disclosed in my patent application, Serial Number 409,559, filed November 25, 1929, the improvement consisting of a means for grinding the feed in such quantities as will be readily consumed by the stock feeding from the apparatus.

More particularly, it is my object to provide an apparatus including a hopper and a feeding trough with a means for grinding grain interposed between the two, such means being automatically operated either directly or indirectly by the animals as they feed from the feeding trough.

A further object is to provide a feeding apparatus in which whole grain may be placed in a hopper with grinders for grinding the grain, the grinders being operated from a door which is raised by animals wishing to feed from the feeding trough.

A further object is to provide a modified form of construction in which an electric motor or other source of power may be utilized for operating the grinders, the door on the feeding trough being utilized to start the operation of the motor, after a predetermined number of animals have fed from the feeding trough.

Another object is to provide automatic means for stopping the operation of the motor driven grinders after a predetermined amount of grain has been ground.

It may here be mentioned that it is difficult to dispense ground grain from a hopper because of its tendency to pack and agitators must be provided to keep it from packing. With the present invention, whole grain is placed in the hopper and will feed freely down to the grinders whereby after it is ground, it may be advanced through a mixing chamber by a spiral conveyor to the feeding trough. When using my present apparatus, the feeder does not have to have his grain ground at a mill, but can place the whole grain in the apparatus and thus a saving is made in the preparation of the grain for feeding.

With the foregoing and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation partly in section of an apparatus embodying my invention.

Figure 2 is a plan view of the left hand end of Figure 1.

Figure 3 is a sectional view on the line 3—3 of Figure 1.

Figure 4 is an end view of the left hand end of Figure 1.

Figure 5 is a sectional view on the line 5—5 of Figure 1.

Figure 6 is a sectional view similar to a portion of Figure 1 showing a modified form of construction.

Figure 7 is a sectional view on the line 7—7 of Figure 6.

Figure 8 is a sectional view on the line 8—8 of Figure 6.

Figure 9 is a sectional view on the line 9—9 of Figure 8; and

Figure 10 is an electrical diagrammatic view of the form of device shown in Figures 6, 7, 8, and 9.

On the accompanying drawings, I have used the reference numeral 10 to indicate a tubular mixing chamber. A feeding trough 12 is mounted on one end thereof. Doors 14 and 16 are hinged to the feeding trough to cover the same. The door 14 is connected with a pawl 18 adapted to coact with a ratchet wheel 20. The door 16 is connected with a link 22 slidably mounted on a pin 24.

A pawl 26 is pivoted to the lower end of the link 22. From the foregoing construction it will be obvious that opening of either of the doors 14 or 16 will but cause rotation of the ratchet wheel 20.

The ratchet wheel 20 is connected to a shaft 28 having a spiral conveyor 30 thereon. The spiral conveyor 30 is adapted to convey ground feed from the right hand end of the apparatus, as shown in Figure 1 to the trough 12. An opening 32 is provided in the mixing chamber 10 for such ground grain to be introduced through into the mixing chamber 10.

Associated with the mixing chamber 10 is a grain hopper 34 adapted to contain whole grain 36. Grinder elements 38 and 40 are located in the hopper 34 to form substantially a bottom therefor, as shown in Figure 5. The grinding elements 38 and 40 are interconnected by gears 42 and 44 for simultaneous rotation. By means of sprocket wheels 46 and 48 and a chain 50, one of the grinder elements is operatively connected with a conveyor shaft 52. The conveyor shaft 52 is operatively connected with the shaft 28 by means of sprockets 54 and 56 and a chain 58. Thus it will be obvious that opening of the doors 14 and 16 will cause operation of the grinding elements 38 and 40.

The grinding elements are comparatively long so as to have a large capacity without excessive speed. The opening 32, however, is comparatively short and a spiral conveyor 60, is therefore, provided to convey the ground grain from the grinding elements into the opening 32.

As illustrated in my co-pending application, an apparatus of this character is adapted for mixing the ground grain with water and retaining it in this condition for a predetermined period of time and for this purpose the mixing chamber 10 is quite long so that fermentation of the feed when mixed with water can be carried to the desired degree. For supplying water to the feed, I have shown in the present application an air tight water supply tank 62 having a pipe 64 extending into the mixing chamber 10 behind a perforated partition 66. The water level in the mixing chamber is automatically maintained at the discharge end of the pipe 64.

I provide a draft chimney 68 to carry away any condensation which might form in the mixing chamber and cause clogging of the ground grain by making it damp. A slight amount of air can enter the feeding trough 12 and will travel over the mixed feed and water in the mixing chamber 10, up through the opening 32 and through openings 70 into the chimney 68 for carrying away damp air and thus avoiding condensation. The spiral conveyor 60 aids in this respect inasmuch as it leaves a small opening 32 through which the ground grain is discharged into the mixing chamber instead of exposing a great deal of the ground grain to the condensation which would form in the mixing chamber.

In the form of device shown in Figures 6, 7, 8 and 9, an electric motor 72 and a reducing gear 74 is provided whereby the electric motor is operatively connected with the grinding elements 38a and 40a on shafts 38b and 40b. The shafts are provided with meshing gears 42a and 44a respectively for causing both shafts to be rotated by the motor 72. In this form of device, the power of the animal is not depended upon for rotating the grinders, but a dispensing device 76 is provided which is operatively connected with the conveyor shaft 28a by sprockets 78 and 80 and a chain 82. The dispensing device 76 allows a predetermined quantity of the grain 36a to drop onto the grinding elements 38a and 40a, after which the motor 72 is automatically started by the mechanism which I will now describe.

A starting switch and underload thermal cutout A is provided into which a control arm 84 extends. The control arm 84 is provided with a boss 86 which rides on the periphery of a disk 88. The disk 88 is provided with a notch 90 into which the boss 86 may drop when the notch and the boss register with each other.

The disk 88 is frictionally connected with a gear 92 and both are loosely mounted on a stub shaft 94. A spring 96 serves to retain the two in frictional engagement. The gear 92 meshes with a pinion 98 attached to the shaft 100 of the dispensing device 76. Thus when the dispensing device 76 has rotated a predetermined number of revolutions, the arm 84 will drop for closing a pair of switch contacts 102 (see Figure 10). The switch contacts 102 control an electric circuit through the motor 72 and through a heating element 104 in the control device A whereby the motor is thrown into operation. The grinding elements 38a and 40a will then grind the grain which has been dispensed by the device 76 during which time the heating element 104 will warp a thermostatic bar 106 for causing contacts 108 to close.

After the contacts 108 have closed, the arm 84 will be raised, thus separating the contacts 102 and this is accomplished by a pawl 109 driven from the motor 72. The pawl 109 is pivoted off-center on the gear 44a, as shown in Figure 8 and is urged by a spring 111 to engage the disc 88. A wire 113 connects the spring 111 with a stationary pin.

The pawl 109 will rotate the disk 88 by engaging the ratchet teeth 110 thereof until the arm 84 is raised whereupon the disk cannot be rotated farther because there are no more ratchet teeth.

The motor circuit is now maintained closed by the contacts 108 until the grain has been ground through the grinding elements 38a and 40a whereupon the load will be decreased, allowing the heating element 104 to cool down and allowing the thermostatic bar 106 to warp back to its normal open circuit position whereupon the motor will be automatically stopped.

From the foregoing description, it will be seen that I have provided an automatic means for grinding grain in accordance with the requirements of the animals feeding from the grinding and feed handling apparatus.

Such changes may be made in the construction and arrangement of the parts of my apparatus as will not depart from the real spirit and purpose of the invention and it is my purpose to cover by my claims any modified forms of structure or variations in steps in the method which may be reasonably included within their scope.

I claim as my invention:

1. In an apparatus of the class described, a hopper, grinding means adapted to receive grain from said hopper and grind the same, a mixing chamber adapted to receive the ground grain from the grinding means, means for supplying fluid to said mixing chamber, a feeding trough adapted to receive the mixed ground grain and fluid from the mixing chamber, means for advancing the ground grain and fluid thru the mixing chamber into the feeding trough and a door on said trough operatively connected with said grinding means and with said advancing means to actuate the same when the door is opened.

2. In an apparatus of the character disclosed, a hopper, a mixing chamber to receive grain therefrom, means for supplying fluid to said mixing chamber, means for advancing feed and fluid thru the mixing chamber, a feeding trough to receive feed and fluid therefrom, a door for the feeding trough operatively connected with the advancing means, a second advancing means between the hopper and the mixing chamber, said second advancing means having an opening which affords communication between the discharge end of the second advancing means and the mixing chamber and a chimney for drawing a draft of air from the feeding trough, over the feed in the mixing chamber and thru said opening.

3. In an apparatus of the character disclosed, a hopper, a mixing chamber to receive grain therefrom, means for supplying fluid to said mixing chamber, means for advancing feed and fluid thru the mixing chamber, a feeding trough to receive the feed and fluid therefrom, a door for the feeding trough operatively connected with the advancing means, a feed grinder between the hopper and the mixing chamber and operatively connected with said door, a second advancing means between the hopper and the mixing chamber, said second advancing means having an opening affording communication between the discharge end of the second advancing means and the mixing chamber and a chimney for drawing a draft of air from the feeding trough, over the feed in the mixing chamber and thru said opening.

4. In an apparatus of the class described, a hopper, grinding means adapted to receive grain from said hopper and grind the same, a feeding trough adapted to receive the ground grain, power means for operating said grinding means and a door on said trough operatively connected with said power means to control the same.

5. In an apparatus of the class described, a hopper adapted to contain grain, a dispensing device connected therewith to receive grain thereupon, grinding means for receiving grain from the dispensing device, a feeding trough adapted to receive the ground grain from the grinding means, power means for operating the grinding means, a door on said feeding trough operatively connected with the dispensing device and means to control the power means from the dispensing device.

6. In an apparatus of the class described, a hopper adapted to contain grain, a movable dispensing device connected therewith to receive grain therefrom, grinding means for receiving grain from the dispensing device, a feeding trough adapted to receive ground grain from the grinding means, power means operatively connected with the grinding means for actuating the same, a door on said feeding trough operatively connected with the dispensing device and means to control the power means from the dispensing device when it moves to a predetermined position.

7. In an apparatus of the class described, a hopper adapted to contain grain, a movable dispensing device connected therewith to receive grain therefrom, grinding means for receiving grain from the dispensing device, a feeding trough adapted to receive ground grain from the grinding means, power means operatively connected with the grinding means for actuating the same, a door on said feeding trough operatively connected with the dispensing device, means to control the starting of the power means from the dispensing device and means to stop the power means after the grain from the dispensing device has been ground.

8. In an apparatus of the class described, a hopper adapted to contain grain, a movable dispensing device connected therewith to receive grain therefrom, grinding means for receiving grain from the dispensing device, a feeding trough adapted to receive ground grain from the grinding means, power means operatively connected with the grinding means for actuating the same, a door on said feeding trough operatively connected with the dispensing device, means to control the starting of the power means from the dispensing device and means to stop the power means after the grain from the dispensing device has been ground, said last means including an underload cut out.

9. In an apparatus of the class described, a hopper adapted to contain grain, a dispensing device connected therewith to receive grain therefrom, grinding means for receiving grain from the dispensing device, a feeding trough adapted to receive the ground grain from the grinding means, power means for operating the grinding means, a door on said feeding trough operatively connected with the dispensing device, means to control the power means from the dispensing device, whereby to start the power means and an underload cut out being provided for stopping the power means after the grain from the dispensing device has been ground.

10. In an apparatus of the class described, a hopper adapted to contain grain, a movable dispensing device connected therewith to receive grain therefrom, grinding means for receiving grain from the dispensing device, a feeding trough adapted to receive ground grain from the grinding means, power means operatively connected with the grinding means for actuating the same, a door on said feeding trough operatively connected with the dispensing device, a switch for starting the power means and operated to closed circuit position by the dispensing device when it assumes a predetermined position, and an underload cut out to stop said power means.

11. In an apparatus of the class described, a hopper adapted to contain grain, a dispensing mechanism connected therewith to receive grain therefrom, a grinding means to receive grain from the dispensing mechanism, a feeding trough adapted to receive ground grain from the grinding means, electric power means operatively connected with the grinding means for actuating the same, a door on said feeding trough and operatively connected with the dispensing mechanism for moving the same, a switch connected with the dispensing mechanism for closing the circuit of the electric power means when the dispensing mechanism moves to a predetermined position and an underload cut out device for stopping the operation of the electric power means.

12. In an apparatus of the character disclosed, a hopper, grinding means connected therewith to receive grain therefrom, a feed trough for receiving ground grain from the grinding means, a door on said trough, electric power means for operating said grinding means, a switch for the electric power means adapted to be closed by said door and an underload cut out included in the circuit of said electric power means.

13. In an apparatus of the class described, a grain hopper, grinding means associated therewith, a feeding trough adapted to receive ground grain from the grinding means, a door on said trough, electric power means for operating the grinding means, a dispenser interposed between the hopper and the grinding means, a main switch operatively connected with the dispenser for closing the circuit through the electric power means, said dispenser being operated from said door, a secondary switch shunted around said main switch, thermal means for closing said secondary switch when the thermal means is energized, the thermal means being included in the circuit of the electric power means, and means for opening the main switch after it has been closed a short period of time, said thermal means serving to open said secondary switch when an underload current flows through the thermal means.

14. In a feed handling apparatus, a hopper, grinding means for receiving grain therefrom and grinding it, a feed trough for receiving grain from said grinding means, a door on the trough, electric power means for operating the grinding means, a dispenser for receiving grain from the hopper and dispensing it to the grinding means said dispenser being actuated by the door when opened, a main switch actuated thereby for closing the circuit through the electric power means and thereby operating the grinding means, a secondary switch, thermal means for closing the same, and means actuated from the power means for opening the main switch after it has been closed and after the secondary switch has also been closed by the thermal means whereby an underload current flowing through the thermal means will open the secondary switch when the grain has been ground by the grinding means.

FRED K. CHANDLER.